(12) United States Patent
Sharma et al.

(10) Patent No.: US 12,461,662 B2
(45) Date of Patent: Nov. 4, 2025

(54) DATA STORAGE DEVICE AND METHOD FOR ENHANCING FAULT TOLERANCE

(71) Applicant: Sandisk Technologies, Inc., Milpitas, CA (US)

(72) Inventors: Amit Sharma, Bangalore (IN); Dinesh Kumar Agarwal, Bangalore (IN); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 77 days.

(21) Appl. No.: 18/625,440

(22) Filed: Apr. 3, 2024

(65) Prior Publication Data

US 2025/0315165 A1    Oct. 9, 2025

(51) Int. Cl.
 *G06F 11/00*    (2006.01)
 *G06F 3/06*    (2006.01)
 *G06F 11/07*    (2006.01)

(52) U.S. Cl.
 CPC ........ *G06F 3/0619* (2013.01); *G06F 11/0751* (2013.01); *G06F 11/0793* (2013.01)

(58) Field of Classification Search
 CPC . G06F 11/0751; G06F 11/0793; G06F 3/0619
 See application file for complete search history.

(56) References Cited

U.S. PATENT DOCUMENTS

| | | | |
|---|---|---|---|
| 7,313,721 B2 | 12/2007 | Ashmore | |
| 8,140,779 B2 | 3/2012 | Topham et al. | |
| 8,453,011 B2 | 5/2013 | Kawaguchi et al. | |
| 10,402,261 B2 | 9/2019 | Sherlock et al. | |
| 10,860,423 B2 | 12/2020 | Chang | |
| 2018/0143774 A1* | 5/2018 | Carson | G06F 11/2071 |
| 2021/0216412 A1* | 7/2021 | Navon | G06F 3/0653 |
| 2022/0083229 A1* | 3/2022 | Tang | G06F 3/0635 |
| 2025/0238361 A1* | 7/2025 | Muthiah | G06F 12/0246 |

* cited by examiner

*Primary Examiner* — Marc Duncan
(74) *Attorney, Agent, or Firm* — Crowell & Moring LLP (57) ABSTRACT

A data storage device and method for enhancing fault tolerance are disclosed. In one embodiment, a method is provided that is performed in a host in communication with first and second data storage devices. The method comprises: determining whether a condition under which primary and secondary copies of data are to be written to the first and second data storage devices, respectively, presents a relatively-high risk of loss of both the primary and secondary copies of the data; and in response to determining that the relatively-high risk is presented, causing the primary and secondary copies of the data to be written differently in the first and second data storage devices, respectively. Other embodiments are provided.

16 Claims, 9 Drawing Sheets

DATA STORAGE DEVICE AND METHOD FOR ENHANCING FAULT TOLERANCE

BACKGROUND

Fault tolerance can be one of the key requirements for mission-critical data (e.g., data that always needs to be available, where there is no downtime or loss of data when the data is accessed). One way to implement fault tolerance is to store two identical copies of the same data. These two copies can be stored in two separate hardware devices, so that both copies of the data will not encounter the same hardware failure.

DETAILED DESCRIPTION

The following embodiments generally relate to a data storage device and method for enhancing fault tolerance. In one embodiment, a method is provided that is performed in a host in communication with first and second data storage devices. The method comprises: determining whether a condition under which primary and secondary copies of data are to be written to the first and second data storage devices, respectively, presents a relatively-high risk of loss of both the primary and secondary copies of the data; and in response to determining that the relatively-high risk is presented, causing the primary and secondary copies of the data to be written differently in the first and second data storage devices, respectively.

In some embodiments, the host causes the primary and secondary copies of the data to be written differently by instructing one of the first and second data storage devices to use a high risk of data loss (HRDL) profile and instructing the other of the first and second data storage devices to use a low high risk of data loss (LRDL) profile.

In some embodiments, the condition comprises programming a multi-level cell (MLC) meta block comprising a program-erase count (PEC) greater than a threshold; and the causing comprises writing one the primary and secondary copies of the data either to an MLC meta block with a PEC less than the threshold or to a single level-cell (SLC) block.

In some embodiments, the condition comprises writing to an open multi-level cell (MLC) block and the causing comprises writing one the primary and secondary copies of the data to a single level-cell (SLC) block.

In some embodiments, the condition comprises programming word lines that are susceptible to error; and the causing comprises using a write offset between the first and second data storage devices.

In some embodiments, the condition comprises writing to blocks that have failed an enhanced post-write read (EPWR) more than a threshold number of times; and the causing comprises ensuring that only one of the first and second data storage devices writes to such a block at any point of time.

In some embodiments, the method further comprises using high risk of data loss (HRDL) and (LRDL) profiles to increase redundancy protection.

In some embodiments, the first and second data storage devices comprise first and second solid-state drives (SSDs).

In some embodiments, at least one of the first and second data storage devices comprise a three-dimensional memory.

In another embodiment, a host is provided comprising: at least one interface configured to communicate with first and second data storage devices; and one or more processors. The one or more processor, individually or in combination, are configured to: store a primary copy of data in the first data storage device; store a secondary copy of the data in the second data storage device; and instruct the first and second data storage devices to scan for an integrity of the primary and secondary copies of the data, respectively, in different orders.

In some embodiments, the different orders comprise older-to-newer and newer-to-older.

In some embodiments, the one or more processors, individually or in combination, are further configured to provide staggered maintenance of the first and second data storage devices.

In some embodiments, the one or more processors, individually or in combination, are further configured to instruct one of the first and second data storage devices to safeguard data in response to a data failure in the other of the first and second data storage devices.

In some embodiments, the data failure is caused by an open block.

In some embodiments, the safeguard comprises stop writing to a current open block.

In some embodiments, the safeguard comprises start writing new data to a single-level cell (SLC) block.

In some embodiments, the safeguard comprises writing two copies of the primary data.

In some embodiments, the safeguard comprises copying content from an open block to a single-level cell (SLC) block.

In some embodiments, the safeguard comprises reverting to normal operating mode after a new secondary copy has been created.

In another embodiment, a data storage device is provided comprising: a memory; and means for using a high risk of data loss (HRDL) profile or a low high risk of data loss (LRDL) profile to write a copy of data in response to an instruction from a host.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
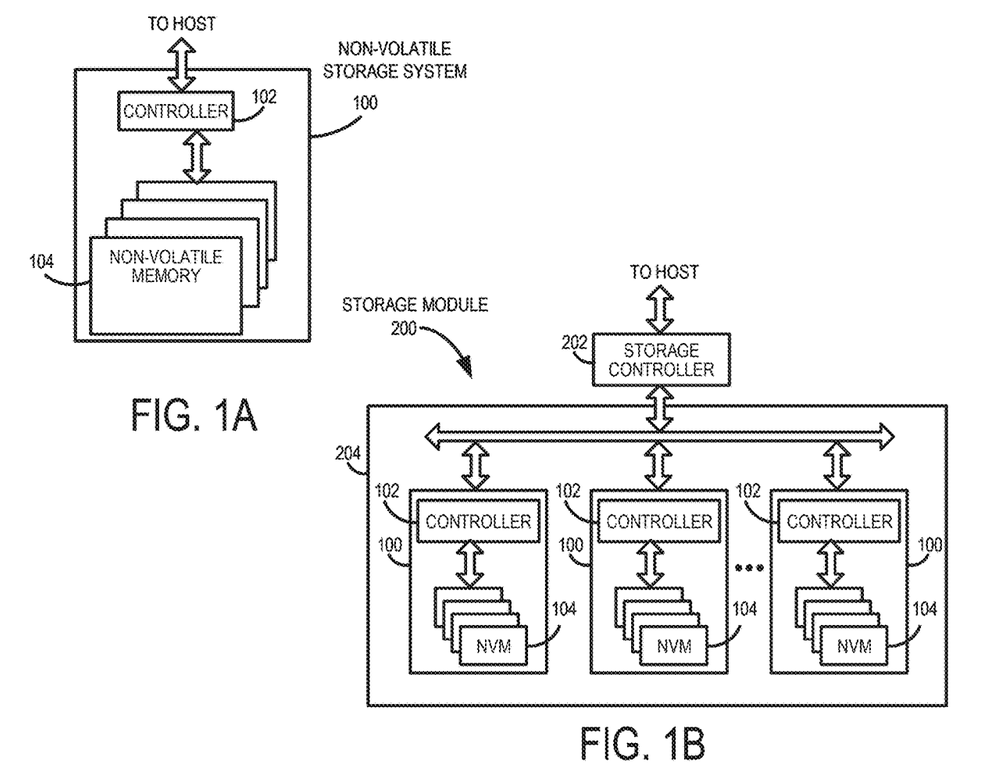
FIG. 1A is a block diagram of a data storage device of an embodiment.
FIG. 1B is a block diagram illustrating a storage module of an embodiment.
Figure 1C:
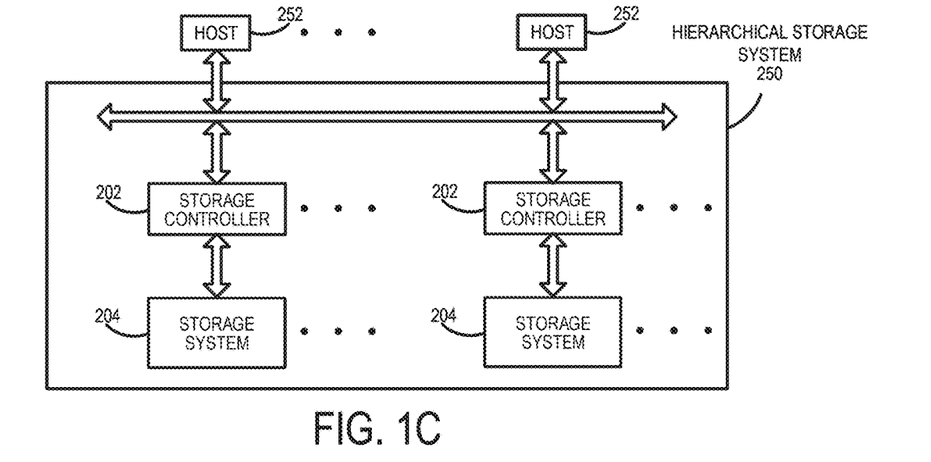
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
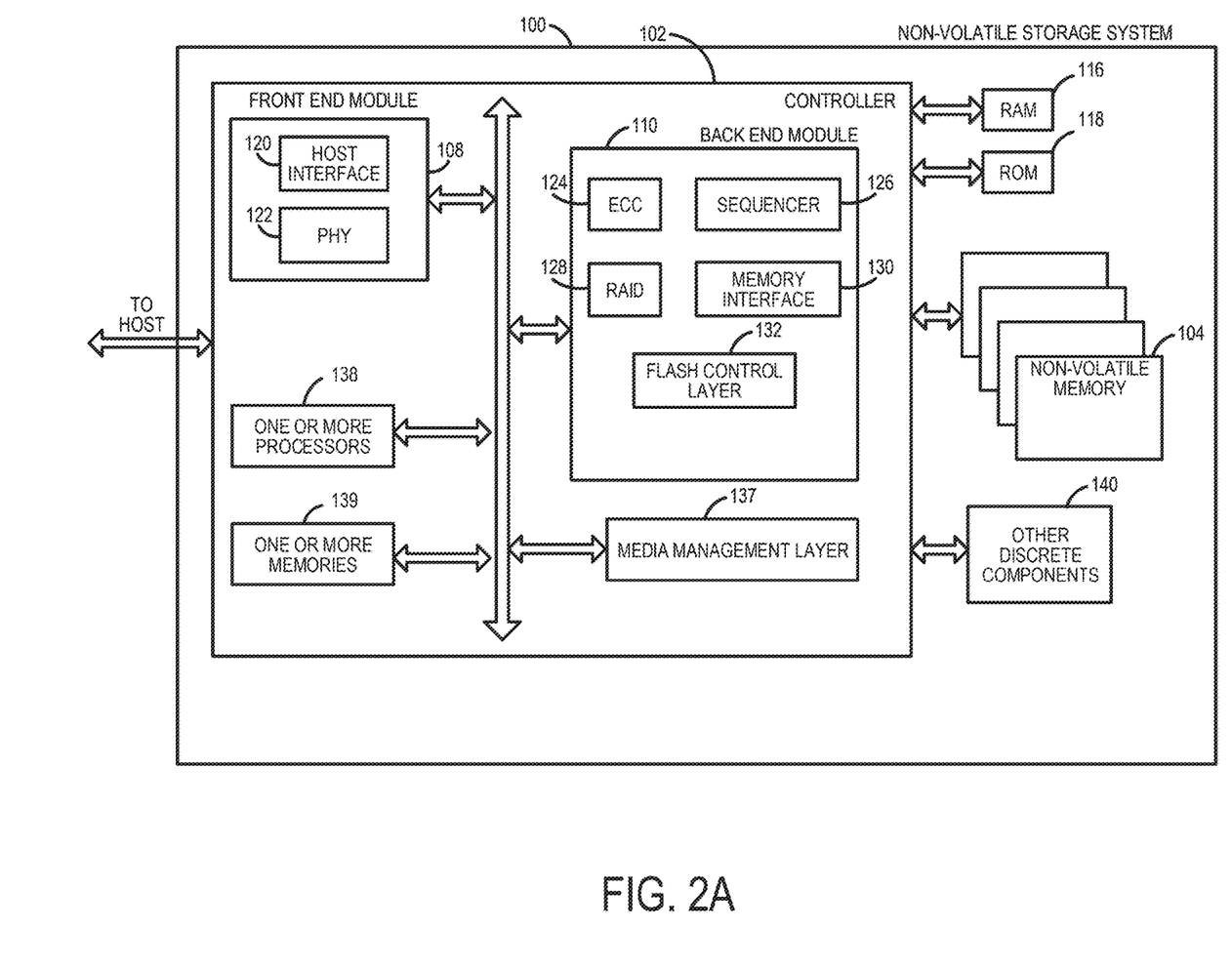
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
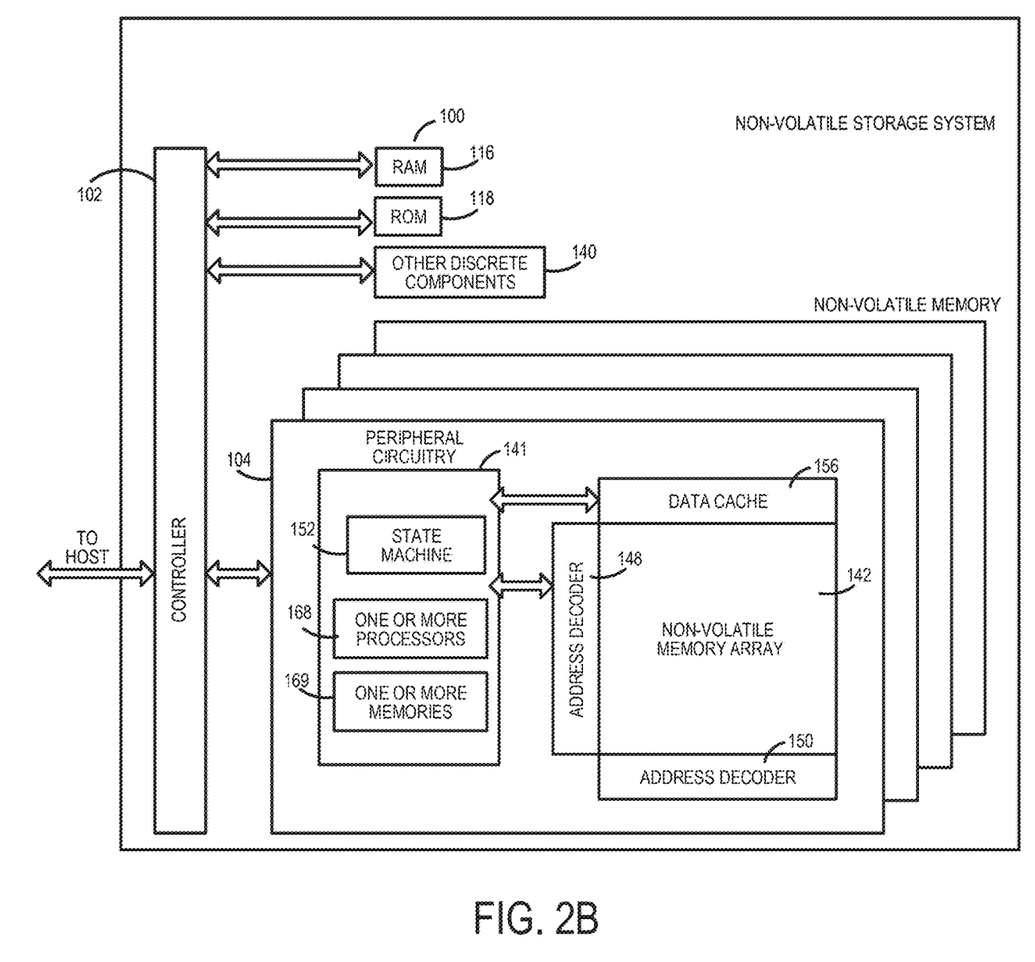
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data, as well as address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL)) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
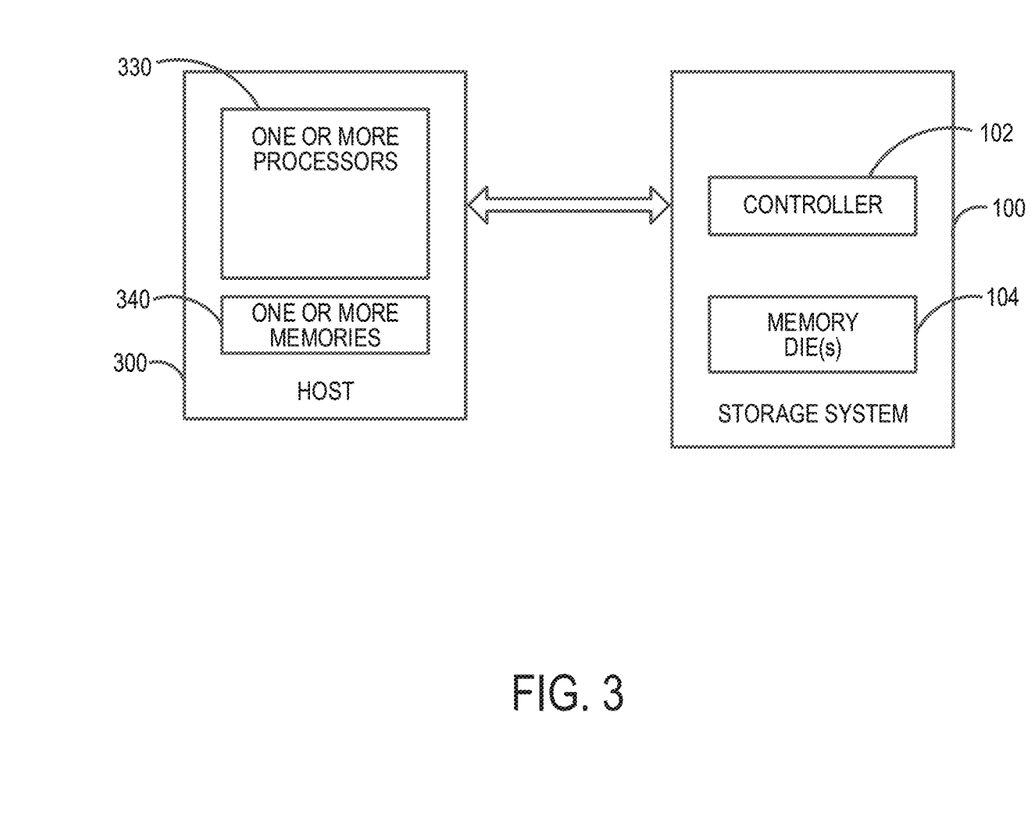
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
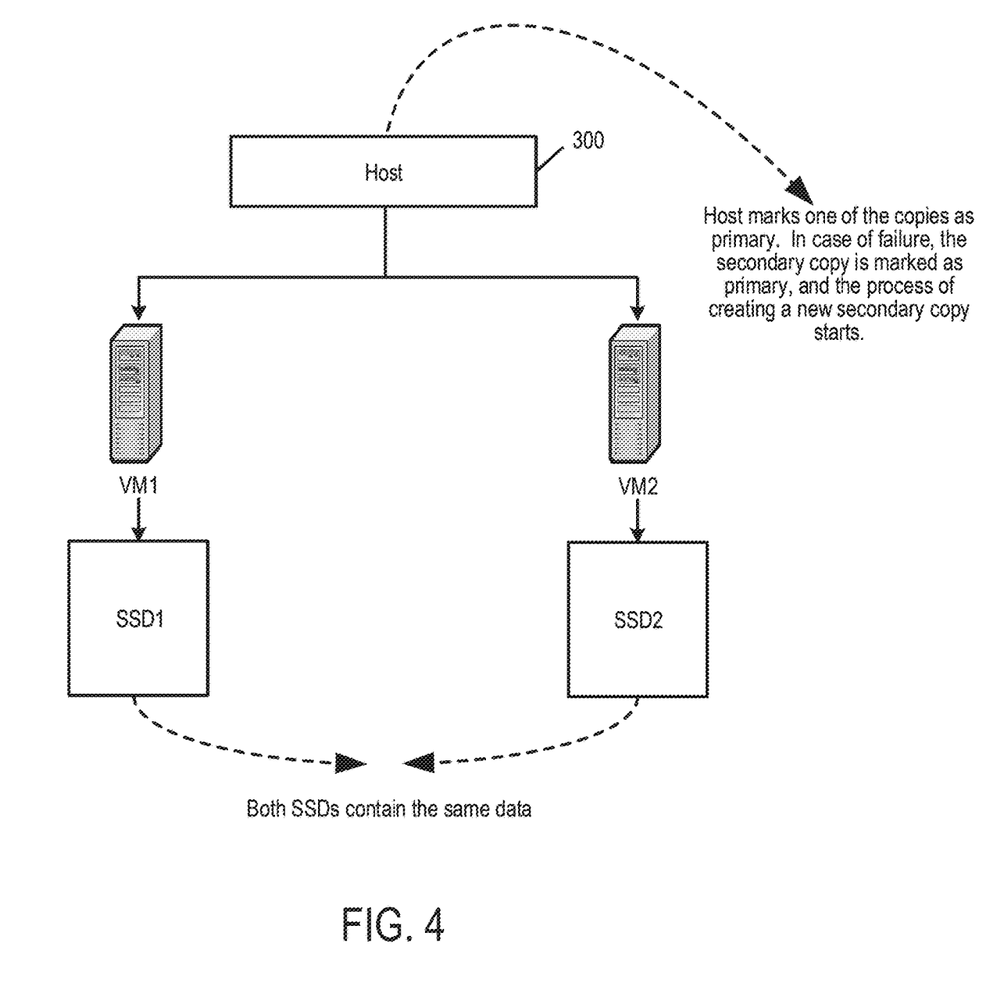
FIG. 4 is a diagram of a fault tolerant system of an embodiment.

As mentioned above, fault tolerance can be one of the key requirements for mission-critical data (e.g., data that always needs to be available, where there is no downtime or loss of data while the data is accessed). One way to implement fault tolerance is to store two identical copies of the same data. These two copies can be stored in two separate hardware devices, so that both copies of the data will not encounter the same hardware failure. FIG. 4 is a diagram of a fault tolerant system of an embodiment. As shown in FIG. 4, the host 300 communicates with two data storage devices (here, first and second solid-state drives (SSD1 and SSD2) through first and second virtual machines (VM1 and VM2). (While SSDs are used in this and the following examples, it should be understood that any suitable data storage device can be used.) The host 300 stores copies of the same data in SSD1 and SSD2. The host 300 marks one of the copies as "primary" and the other as "secondary." In case of a failure in reading the primary copy, the host 300 marks the secondary copy as primary and then creates a new secondary copy (as a backup for the new primary copy). As mentioned above, instead of storing the two copies of the data in two different data storage devices, the two copies of the data can be stored in the same data storage device (e.g., in different parts/zones of the memory, in different memory dies, etc.). Also, more that two copies can be used.

As mentioned above, storing two copies of the same data provides fault tolerance, as having two copies of same data decreases the chances of failure. However, most of the failures encountered by a data storage device, such as an SSD, can occur under certain conditions or operations. The phrase "high-risk data loss (HRDL)" will be used herein to refer to situations that are at relatively-high risk of data loss. The risk can be assessed in any suitable way (e.g., by comparison to a threshold, by matching certain parameters, etc.) If both data storage devices in the fault tolerant system are at high risk of data loss, there is a chance that both copies of the data can fail at or around the same time. This can increase the chances of the data loss and/or can trigger error recovery in both data storage devices at same time. Some of these recovery mechanisms (e.g., XOR) can take hundreds of milliseconds and increase access latencies, which is not desired for mission-critical data.

The following embodiments can be used to address this problem. In one embodiment, the host 300 identifies HRDL situations (e.g., operations/conditions that have a high-risk of data loss potential). When an HRDL situation is identified, the host 300 establishes a safeguard (e.g., so that both the primary and secondary virtual machines (VMs) are not concurrently operating in high-risk zones of the memor(ies) of the data storage device(s)). Also, each data storage device can optimize a periodic data "sanity check" to enhance data protection by synchronizing these checks between the primary and secondary data storage devices. Also, another embodiment presented herein provides a methodology to reduce chances of error on the primary copy if one of the data storage devices encounters a failure.

In one example implementation, the host 300 can direct the data storage devices to operate either using a high risk of data loss (HRDL) profile or a low risk of data loss (LRDL) profile. Each data storage device can change its data program methodologies based on this host directive. Also, a data storage device can perform read scrub scans on different data regions to ensure enhanced data protection. Further, if one of the copies of the data fails in one of the data storage devices, the host 300 can send a communication to the other data storage device to ensure that the now-primary copy does not encounter failures.

Figure 5A:
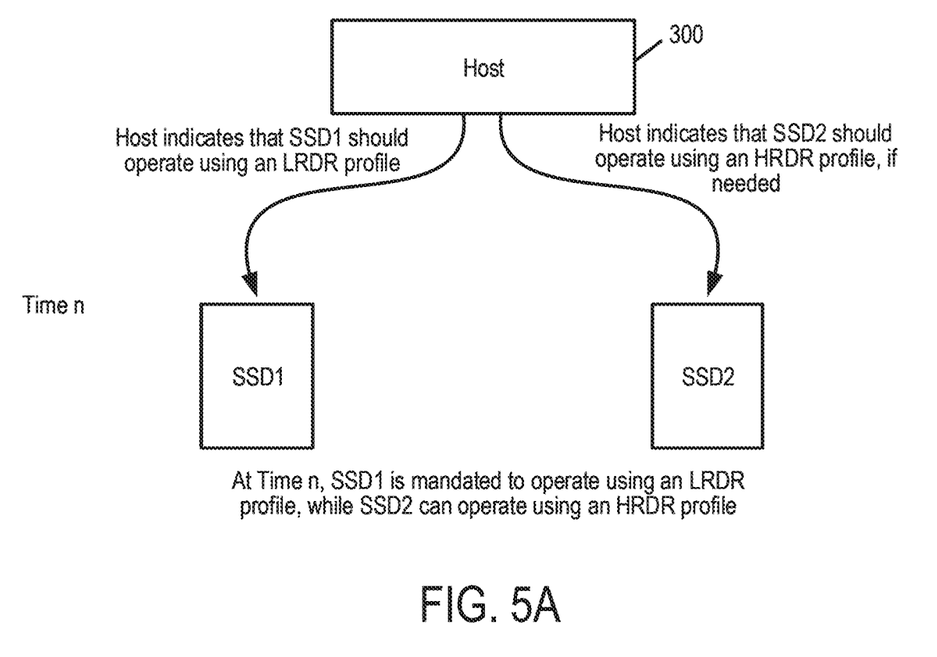
FIGS. 5A and 5B are diagrams illustrating risk profile rotation by a host in a fault tolerant system of an embodiment.
Figure 5B:
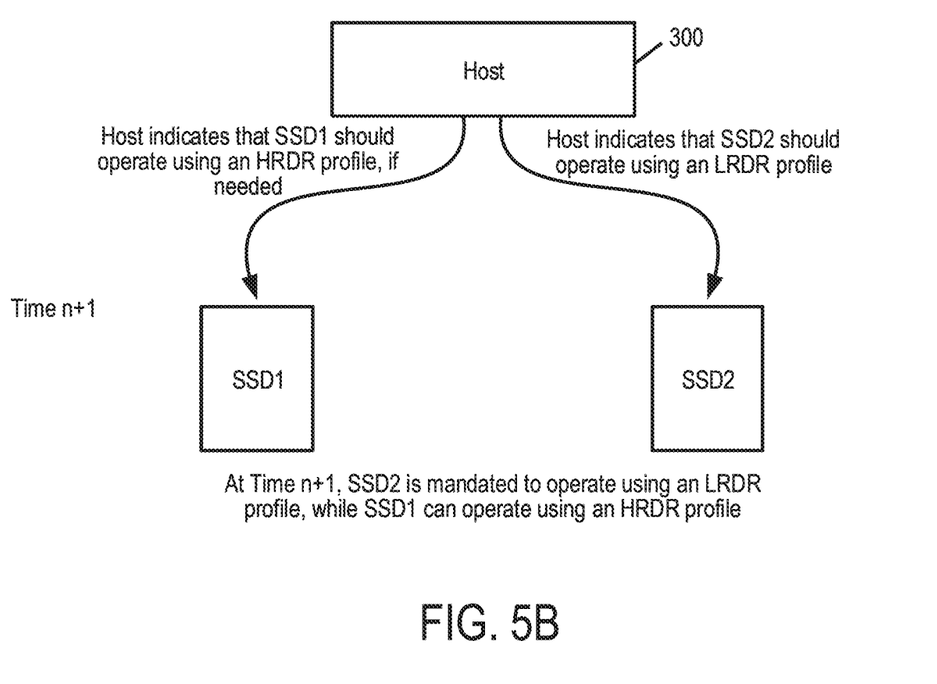

The following paragraphs provide examples of various embodiments. It should be understood that these are merely examples and that other implementations can be used. As such, the details presented herein should not be read into the claims unless expressly recited therein. In one example, the host 300 can distinguish between high-risk and low-risk operations, and, which a high-risk operation is detected, ensures that at least one copy operates with a low risk profile, as a high-risk profile can have a greater chance of device failure. To ensure data safety, the host 300 can cause only one data storage device to engaged in high-risk operations at any given time. More specifically, the host 300 can pass a directive to the primary and secondary data storage devices to operate using a certain risk profile. This example is illustrated in FIGS. 5A. and 5B. As shown in FIG. 5A, at Time n, the host 300 instructs SSD1 to operate using a LRDL profile and also instructs SSD2 to operate using an HRDL profile, if required. It may not always be possible to operate an SSD using an LRDL profile. As such, the host 300 can rotate the LRDL profile among SSDs (e.g., periodically), as shown in FIG. 5B, which shows that, at Time n+1, the host 300 instructs SSD2 to operate using a LRDL profile and also instructs SSD1 to operate using an HRDL profile, if required. Risk profile rotation can be done at any logical boundary (e.g., when a meta-block-wroth of data gets written to the SSD).

HRDL and LRDL profiles can take any suitable form. For example, programming of a high program-erase count (PEC) multi-level cell (MLC) meta block (e.g., a block comprises memory cells from a plurality of memory dies) can be more likely to exhibit errors. Data protection scheme (e.g., based on XOR) can be used to correct errors in a failing meta block of one of the memory dies. However, if multiple failures are encountered (e.g., where a meta block has blocks from 16 memory dies), the data storage device may not be able to recover data. In this situation, the host 300 can mitigate to low risk by writing one of the copies of the data to a low PEC MLC or write the data to a single-level cell (SLC) block.

Another example of a high-risk situation is the open block MLC problem. Blocks that are not fully programmed are called open blocks. Open blocks are prone to more data-loss issues, specially data retention issues. These problems are more severe in MLC blocks. The host 300 mitigate this risk to a lower level by causing one of the data storage devices to write data to SLC blocks.

Yet another example of a high-risk situation is due to NAND geometry where certain word lines are more susceptible to errors than others. If both data storage devices are programmed to these type of word lines, the probability of both word lines failing at same time increases. To mitigate this high risk to a lower risk, the host 300 can maintain a write offset between the two data storage devices to ensure that both data storage devices do not program data to same word line numbers.

Blocks that having an enhanced post-write read (EPWR) failure presents another example of a high-risk situation. Many storage architectures are allowed to keep using blocks having EPWR failures. These blocks are retired only after they fail EPWR beyond a certain threshold number of times. However, these blocks are more unreliable compared to other blocks. If both data storage devices write data to these kinds of blocks, the chance of simultaneous failures is high. To mitigate this to a lower risk, the host 300 can ensure that only one data storage devices writes to these types of block at any point of time.

Figure 6:
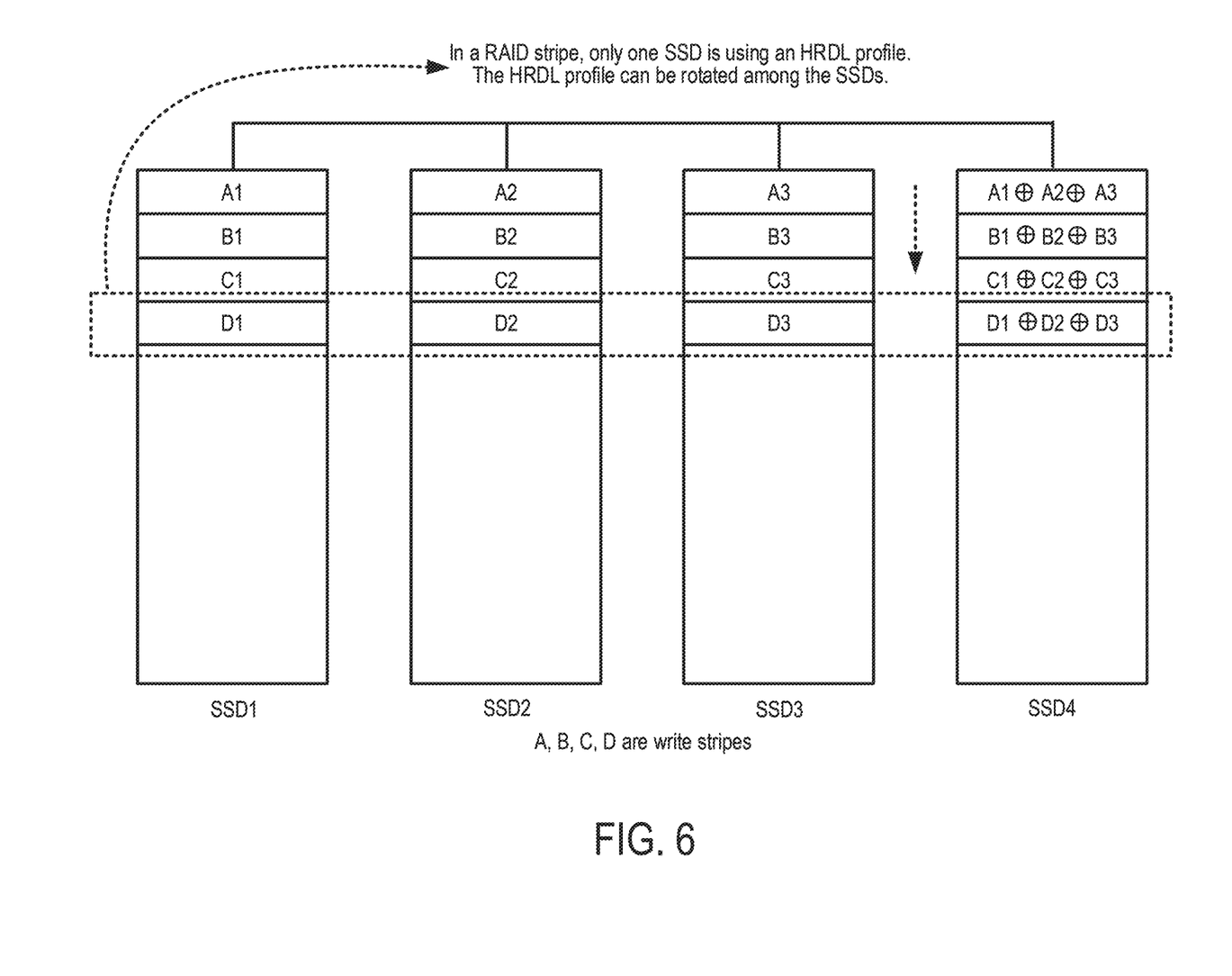
FIG. 6 is an illustration of enhancing redundancy protection of an embodiment.

In addition to increasing fault tolerance, these profiles can be used to increase redundancy protection (e.g., in a redundant array of independent drives (RAID) environments). For example, the host 300 can ensure that only one data storage device is operating using the HRDL profile, which can reduce the chance that two data storage devices within a RAID stripe would fail simultaneously. This example is illustrated in FIG. 6.

Figure 7:
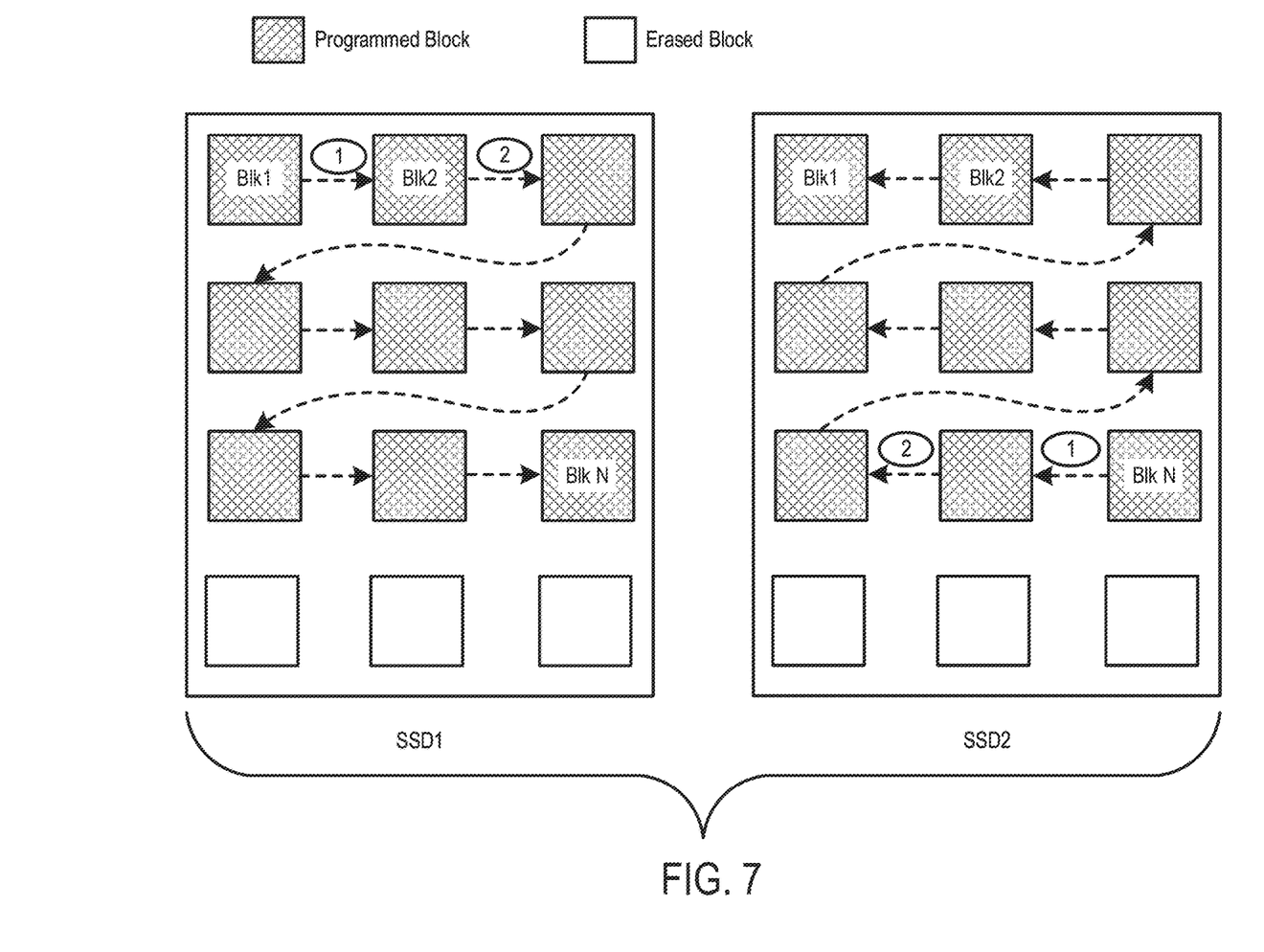
FIG. 7 is an illustration of data scatter ordering in a data storage device of an embodiment.

In another embodiment, fault tolerance is enhanced by scanning different regions in the memory of the data storage device. The data storage device can utilize internal periodic scans to assess the integrity (e.g., the bit error rate (BER)) of stored data. These scans can be completed for the entire storage capacity within a specified timeframe, such as 48 hours. In an isolated environment, the data storage device can trigger the scan in any order. However, in this embodiment, because there are two sets of the same data available in the fault tolerant system, the scan can be started on different sets of data, so that, as the logical level, complete valid data gets scanned more frequently. FIG. 7 is an illustration of this data scatter ordering embodiment. As shown in FIG. 7, the host 300 can assist the data storage device by providing an indication that determines the order in which data should be scanned (e.g., from older to newer data, or from newer to older data) in order to accomplish this task.

Figure 8A:
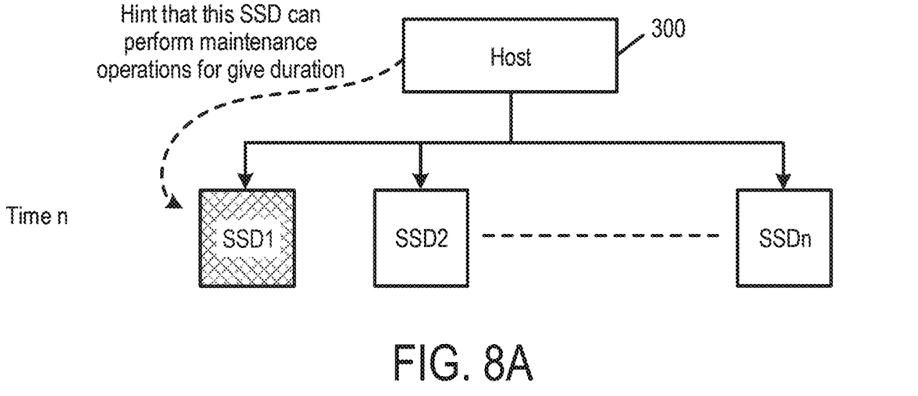
FIGS. 8A, 8B, and 8C are illustrations of phasing maintenance operations in a plurality of data storage devices of an embodiment.
Figure 8B:
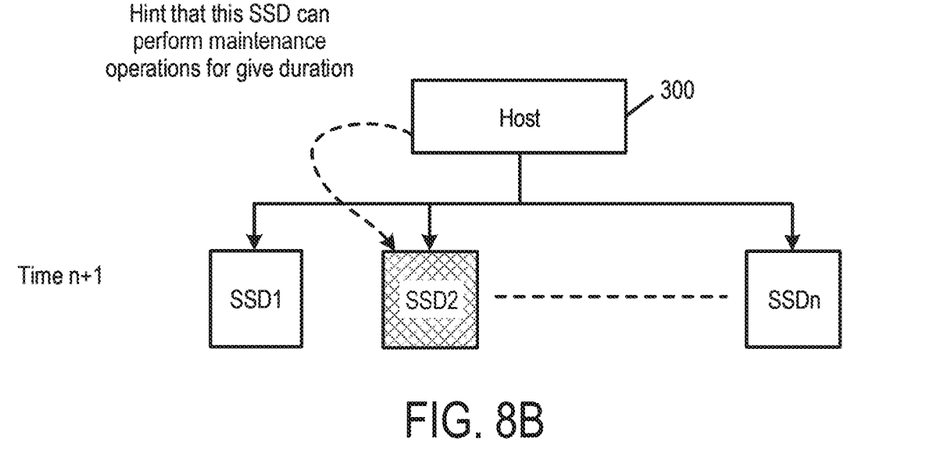
Figure 8C:
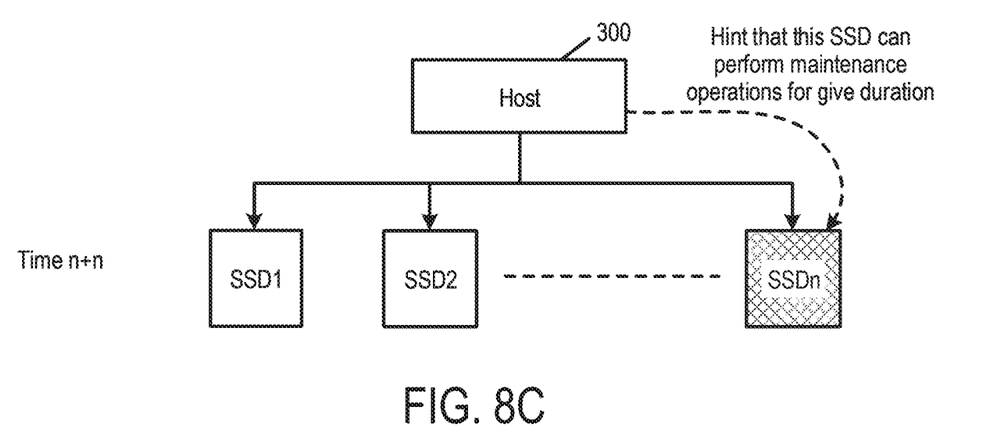

Further, this embodiment can be extended to provide phased/staggered maintenance in a multiple data storage device environment. For example, when the data storage device performs maintenance operations, it increases latency of the data storage devices. In this embodiment, the host 300 can direct one or more of the data storage devices to perform maintenance operations in a phased manner. This can help ensure that not all data storage devices are performing maintenance at same time. This embodiment is illustrated in FIGS. 8A, 8B, and 8C.

Yet another embodiment relates to device handling after one the copies of the data has failed. When one of the copies has failed, the primary copy become critical as it is the sole copy left in system. Program operations to an open block can cause failures that can corrupt the full block. Hence, after failure of one copy, the host 300 can send a hint to the primary data storage device to take actions to safeguard data. These actions can include, stop writing to the current open block as further writes can cause failures to existing data, start writing new data to an SLC block and increase data protection by potentially writing two copies of same data in the primary data storage device, have the primary data storage device copy content from the open block to the SLC block, and/or have the primary data storage device go back to normal operating mode once the host 300 sends a hint that a new secondary copy has been created.

There are several advantages associated with these embodiments. For example, these embodiments can enhance the fault tolerance of data storage devices within a fault-tolerant system during program operations. These embodiments can also increase protection in RAID systems. Further, the embodiments can provide phased maintenance that can help to reduce system latencies.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method comprising:
performing in a host in communication with first and second data storage devices:
determining whether a condition under which primary and secondary copies of data are to be written to the first and second data storage devices, respectively, presents a relatively-high risk of loss of both the primary and secondary copies of the data; and
in response to determining that the relatively-high risk is presented, causing the primary and secondary copies of the data to be written differently in the first and second data storage devices, respectively;
wherein:
the condition comprises programming a multi-level cell (MLC) meta block comprising a program-erase count (PEC) greater than a threshold; and
the causing comprises writing one the primary and secondary copies of the data either to an MLC meta block with a PEC less than the threshold or to a single level-cell (SLC) block.

2. The method of claim 1, wherein the host causes the primary and secondary copies of the data to be written differently by instructing one of the first and second data storage devices to use a high risk of data loss (HRDL) profile and instructing the other of the first and second data storage devices to use a low high risk of data loss (LRDL) profile.

3. The method of claim 1, further comprising using high risk of data loss (HRDL) and (LRDL) profiles to increase redundancy protection.

4. The method of claim 1, wherein the first and second data storage devices comprise first and second solid-state drives (SSDs).

5. The method of claim 1, wherein at least one of the first and second data storage devices comprise a three-dimensional memory.

6. A host comprising:
at least one interface configured to communicate with first and second data storage devices; and
one or more processors, individually or in combination, configured to:
store a primary copy of data in the first data storage device;
store a secondary copy of the data in the second data storage device; and
instruct the first and second data storage devices to scan for an integrity of the primary and secondary copies of the data, respectively, in different orders.

7. The host of claim 6, wherein the different orders comprise older-to-newer and newer-to-older.

8. The host of claim 6, wherein the one or more processors, individually or in combination, are further configured to provide staggered maintenance of the first and second data storage devices.

9. The host of claim 6, wherein the one or more processors, individually or in combination, are further configured to instruct one of the first and second data storage devices to safeguard data in response to a data failure in the other of the first and second data storage devices.

10. The host of claim 9, wherein the data failure is caused by an open block.

11. The host of claim 9, wherein the safeguard comprises stop writing to a current open block.

12. The host of claim 9, wherein the safeguard comprises start writing new data to a single-level cell (SLC) block.

13. The host of claim 9, wherein the safeguard comprises writing two copies of the primary data.

14. The host of claim 9, wherein the safeguard comprises copying content from an open block to a single-level cell (SLC) block.

15. The host of claim 9, wherein the safeguard comprises reverting to normal operating mode after a new secondary copy has been created.

16. A data storage device comprising:
a memory; and
means for:
determining whether a condition under which primary and secondary copies of data are to be written to the first and second data storage devices, respectively, presents a relatively-high risk of loss of both the primary and secondary copies of the data; and
in response to determining that the relatively-high risk is presented, causing the primary and secondary copies of the data to be written differently in the first and second data storage devices, respectively;
wherein:
(1) the condition comprises writing to an open multi-level cell (MLC) block and the causing comprises writing one the primary and secondary copies of the data to a single level-cell (SLC) block;
(2) the condition comprises programming word lines that are susceptible to error; and the causing comprises using a write offset between the first and second data storage devices; or
(3) the condition comprises writing to blocks that have failed an enhanced post-write read (EPWR) more than a threshold number of times; and the causing comprises ensuring that only one of the first and second data storage devices writes to such a block at any point of time.

* * * * *